3,415,786
COPOLYMERIZATION OF TRIOXANE AND NOR-
BORNADIENE IN A TWO-STAGE PROCESS
Kornel D. Kiss, University Heights, Ohio, and Jerry T.
  Reed, Houston, Tex., assignors to Diamond Shamrock
  Corporation, a corporation of Delaware
No Drawing. Filed June 7, 1965, Ser. No. 462,090
6 Claims. (Cl. 260—67)

ABSTRACT OF THE DISCLOSURE

Thermally stable, high molecular weight oxymethylene copolymers are prepared in pulverulent form by reacting a mixture containing a major amount of trioxane, a minor amount of norbornadiene and a cationically-active polymerization catalyst in a reaction vessel fitted with a high-speed stirrer until copolymerization is about 20% complete. The reaction mixture is then transferred to a reactor adapted to impart high shear thereto and the reaction is continued under high-shear conditions until copolymerization is at least 90% complete.

---

This invention relates to polymerization methods, and more particularly to a method for the preparation of oxymethylene copolymers of high thermal stability in a form which is particularly convenient for further processing.

Copending application Ser. No. 449,271, filed Apr. 19, 1965, relates to copolymers of trioxane with norbornadiene monomers in which the norbornadiene content is about 0.1–10 mole percent. These copolymers are thermoplastic and have a high degree of thermal stability. Moreover, they are tough and durable and may be molded, cast or extruded into a number of useful articles.

The method for the preparation of the copolymers in Ser. No. 449,271 is applicable generally when a polymer having a minimum inherent viscosity of 0.7, i.e., a molecular weight of at least 10,000, is desired. Inherent viscosity as reported in this application is determined from a solution of 0.5 gram of polymer in 100 ml. of p-chlorophenol containing 2% by weight of alpha-pinene, at 60° C. For injection molding and similar purposes, however, it is desirable to obtain a polymer with a molecular weight consistently above about 30,000, which value corresponds to an inherent viscosity of at least about 1.2.

As a general rule, oxymethylene polymers and copolymers of high molecular weight may be obtained by carrying out the polymerization reaction in a reaction which imparts high shear to the mixture. Such reactors are, however, expensive to obtain and operate and do not permit convenient temperature control when the reaction mixture is a liquid or a thin slurry. For this reason, it is of interest to develop a method for the preparation of high molecular weight, thermally stable oxymethylene copolymers which combines the advantages of a high shear reactor with the economy and convenience of use of a conventional reactor.

A principal object of the present invention, therefore, is to prepare oxymethylene-norbornadiene copolymers of high molecular weight and thermal stability in a convenient physical form.

A second object is to provide an economical and convenient method for preparing oxymethylene-norbornadiene copolymers.

A third object is to provide a method for the preparation of large quantities of trioxane-norbornadiene copolymer while maintaining control of the reaction temperature.

Other objects will in part be obvious and will in part appear hereinafter.

According to the present invention, a thermally stable oxymethylene copolymer is obtained by (1) reacting, in an inert atmosphere and under substantially anhydrous conditions, at a temperature of about 55–68° C., a major amount of trioxane and a minor amount of a compound of the formula

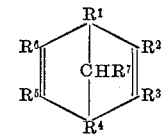

wherein $R^1$ through $R^7$ are selected from the group consisting of hydrogen and lower alkyl radicals having up to four carbon atoms, with no more than one R group being an alkyl radical, in the presence of about 0.05–10.0 millimole per mole of trioxane of a cationic polymerization catalyst, until copolymerization is at least about 20% complete; and (2) transferring the reaction mixture to a reactor adapted to impart high shear thereto and continuing said reaction under high-shear conditions until copolymerization is at least about 90% complete.

The copolymers prepared according to the method of this invention contain a major amount of trioxane and a minor amount of a norbornadiene monomer. The term "norbornadiene monomer" as used herein is intended to refer to unsubstituted norbornadiene and to norbornadienes having only one lower alkyl group attached to the ring. Substituted norbornadienes especially suitable for use are those substituted in the 2 and 4 positions of the norbornadiene ring, e.g., 2-methylnorbornadiene, 4-methylnorbornadiene and the like. Because of its ready availability, unsubstituted norbornadiene is the referred comonomer and specific reference will be made hereinafter to norbornadiene. The preferred compositions contain from about 90 to about 99.9 mole percent of trioxane units and about 0.1 to 10 mole percent of norbornadiene units, but polymers containing about 95–99.7 mole percent of oxymethylene and about 0.3–5 mole percent of norbornadiene have been found particularly desirable. The composition of the copolymers may be determined by elemental carbon-hydrogen analysis.

The copolymerization reaction is effected in the presence of a cationic polymerization catalyst. Suitable catalysts include Lewis acids such as the halides of such metals as aluminum, boron, tin, titanium, zirconium, strontium, niobium and the like, and coordination complexes of such metal halides with organic compounds where oxygen, nitrogen or sulfur is the donor atom. Especially preferred are boron trifluoride complexes with alcohols, phenols, acids, ethers, acid anhydrides, esters, ketones, aldehydes, dialkyl sulfides, mercaptans and the like. Of these types, the boron trifluoride complexes with ethers such as diethyl ether, butyl ether and the like are especially preferred. Fluoroborate aryl diazonium salts, such as phenol diazonium fluoroborate, are also suitable catalysts. In general, the catalysts may be used in amounts ranging from about 0.05 to about 10.0 millimoles per mole of trioxane. However, the preferred catalyst concentration is about 0.1 to 3.0 millimoles per mole of trioxane.

The polymerization reaction may be effected in bulk—that is, in the absence of a solvent—or in the presence of a suitable solvent for the comonomers. Solvents preferably employed are aliphatic and cycloaliphatic hydrocarbons, e.g., hexane, cyclohexane, heptane and the like. In the method of the present invention, it is preferred that the weight of solvent be no more than about 30% of the total weight of the reaction mixture. Under these conditions, the polymeric product is a free-flowing powder containing occluded solvent which may be removed by leaching with acetone or the like.

According to the present invention, the initial stages of the polymerization reaction are carried out in an ordinary reaction vessel. This vessel may be, for example, a jacketed flask or reactor fitted with stirring apparatus (preferably adapted for high-speed stirring) and adapted for convenient temperature control. The monomers, together with catalyst and solvent, if a solvent is to be used, are charged to the reaction vessel and maintained at a temperature of about 55–68° C., preferably 60–65° C. There is usually an induction period of about 10–30 minutes before polymerization begins, after which the reaction mixture is gradually converted from a solution into a slurry as the polymer is formed and separates from the solution.

Before the consistency of the reaction mixture becomes such that free flow from one reactor to another is impossible, said mixture is transferred to a high-shear reactor for the second stage of the reaction. Ordinarily, the polymerization reaction is about 15–20% complete at the time this transfer occurs. However, completion may be higher (e.g., about 30–40%) when the reaction is run on a large scale and the passage from the first to the second reactor is large and not readily susceptible to clogging. Additional quantities of solvent or catalyst may, if desired, be introduced at the beginning of the second stage.

The high shearing forces provided in the second reactor cause the formation of a finely divided, powdery polymer of high molecular weight. This polymer may contain occluded solvent if a solvent was used in the reaction; in that case, the solvent and any unreacted monomer may be removed from the polymer by one of the methods described hereinabove.

Examples of high-shear reactors which have been found suitable for use in the present invention include the "Banbury mixer;" the "Sigma mixer" and the "Readco Continuous Processor" twin screw mixer, both manufactured by the Read Corporation; the "Ko-Kneader" described in U.S. Patent 2,505,125; and, for small-scale experimental reactions and the like, a modified "Brabender Plastograph." The "Sigma mixer" is a vessel fitted with two horizontally extending paddles which rotate in opposite directions, preferably in intermeshing paths. The "Banbury mixer" contains a reaction cavity with two paddles which rotate in non-intermeshing paths at identical or different rates. The "Brabender Plastograph" is a small-scale apparatus containing interchangeable units of the Sigma and Banbury types; it is designed principally for measuring the viscosity of polymer mixtures, but may be adapted as a reaction vessel for small-scale polymerizations. The "Readco Continuous Processor" contains intermeshing twin screws, each of which wipes the surface of the other continuously as well as the surface of the shell in which the reaction takes place. The "Ko-Kneader" contains a mixer barrel provided with rows of teeth along its inner surface and a screw fitting in the barrel, said screw being both rotatable and reciprocable so that the teeth on the barrel pass through interruptions in the screw thread.

Because the polymers prepared by the method of this invention usually contain hydroxyl end groups linked to oxymethylene units, they may be thermally unstable to a certain degree. Before processing, therefore, it is preferred to heat the polymer to a temperature at which degradation will take place (about 220° C.) until the unstable end groups have been removed. As soon as the first comonomer (norbornadiene) unit has become the end group, the polymer is stable and may be subjected to molding, casting or extruding operations.

Thermal stability of the copolymers prepared by the method of this invention is measured by the constant rate at which these copolymers degrade or decompose at an elevated temperature at which degradation may be easily and accurately measured. This value is measured by well known thermogravimetric analytical techniques, using a Stanton Automatic Recording Thermobalance, High Temperature Model. Throughout the test, the copolymer is maintained at a temperature of 220° C., the decomposition of the copolymer as measured by loss in weight and the time of the test in minutes being automatically recorded. After the heat treatment, the decomposition rate of the copolymer is obtained by plotting, as the ordinate, the logarithm of the weight percent of the remaining undegraded copolymer against the corresponding time of oven exposure. A curve drawn through the plotted values indicates that, after rather rapid degradation initially (because of end-group removal as described hereinabove), the copolymer degrates at a much lower even rate throughout the major portion of the degradation period, which slower rate characterizes the stable nature of the copolymer. Accordingly, the reaction rate constant for thermal degradation of the copolymers of this invention is selected from this latter portion of the degradation curve and is expressed as weight percent pre minute. The percentage of copolymer remaining after decomposition has ceased is recorded as "percent stable." The copolymers of this invention generally exhibit a reaction rate constant for thermal degradation at 220° C. of 0.4 weight percent per minute or less, with the preferred copolymers exhibiting reaction rate constants of 0.2 weight percent per minute or less.

The method of this invention is superior to single-stage reaction systems in that it permits the use of a simple reaction vessel which provides better heat transfer and temperature control conditions for the liquids and thin slurries which are formed in the initial, strongly exothermic, stages of the reaction; while the latter stages, in which a solid product is formed and in which the temperature control problem is one of heat transfer rather than exothermicity, are susceptible to better temperature control in a high-shear mixer. Moreover, the present invention permits the economical use of relatively inexpensive equipment in the first stage of the reaction; the high-shear apparatus, which is essential for the later stages but is relatively costly to operate, is only used when necessary.

The invention is illustrated by the following exemplary procedure; details as to amounts, conditions and properties of products are given in the table hereinafter.

Trioxine, norbornadiene, and cyclohexane (when a solvent is used) are charged to a jacketed reaction flask fitted with a stirrer. The flask is heated to about 60° C. and boron trifluoride dibutyl etherate is introduced with a hypodermic syringe to initiate polymerization. The reaction is allowed to proceed, with stirring, at a temperature no higher than 68° C. until the reaction mixture has become a heavy suspension with approximately the consistency of catsup. (This state is attained at about 20% conversion.) The mixture is then transferred to a high-shear mixer and polymerization is continued. The mixture thickens and eventually is converted into a fine, powdery polymer containing occluded solvent. The polymer is suspended in acetone, filtered, washed with hot water and acetone to remove unreacted monomer, catalyst residues and occluded solvent, and dried. Degree of polymerization and thermal stability are then determined by inherent viscosity and thermogravimetric analysis measurements. The following table lists the results of a number of experiments made according to the above-described procedure.

| | | | | |
|---|---|---|---|---|
| Trioxane (ml.) | 50 | 504 | 50 | [1] 8,390 |
| Norbornadiene (ml.) | 2.02 | 20.4 | 2.02 | 290 |
| Solvent (ml.) | 21.44 | 100 | 21.44 | 600 |
| Catalyst (mmol.) | 1.19 | 8.75 | 1.19 | [2] 19.5 |
| Second stage reactor | Brabender | Sigma mixer | Brabender | Continuous processor, Sigma mixer [3] |
| Second stage temp., °C | 60 | 60 | 60 | 60 |
| Second stage time, min | 4 | 110 | 120 | 112 |
| Yield, g | 39 | 530 | 43 | |
| Inh. viscosity | 1.40 | 1.4 | 1.44 | 1.30 |
| Decomp. rate, wt. percent per min | 0.42 | 0.08 | 0.12 | 0.07 |
| Percent stable | 76 | 80 | 65 | 77 |

[1] Grams.
[2] Millileter.
[3] First part of second stage in continuous processor; second part in Sigma mixer.

It is to be understood that the invention is not limited by the specific examples and embodiments described hereinabove, but includes such changes and modifications as may be apparent to one skilled in the art upon reading the appended claims.

What is claimed is:

1. A method for the preparation of a thermally stable pulverulent polyoxymethylene copolymer under controlled temperature conditions which comprises: (1) reacting in an inert atmosphere and under substantially anhydrous conditions, a mixture of a major amount of trioxane and a minor amount of a compound of the formula

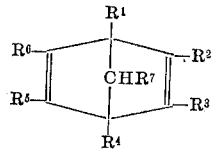

wherein $R^1$ through $R^7$ are selected from the group consisting of hydrogen and lower alkyl radicals having up to four carbon atoms, with no more than one R group being an alkyl radical, in the presence of about 0.05–10 millimols per mole of trioxane of a polymerization catalyst which is a halide of aluminum, boron, tin, titanium, zirconium, strontium or niobium or a coordination complex of any of these metal halides with an organic compound wherein oxygen, nitrogen or sulfur is the donor atom, until copolymerization is at least about 20% complete in a reaction vessel equipped with a high-speed stirrer whereby the temperature of the reaction mixture is efficiently controlled at 60–65° C.; and (2) thereafter transferring the reaction mixture to a reactor adapted to impart high shear thereto and continuing said reaction under high-shear conditions likewise at a reaction temperature of 60–65° C. until copolymerization is at least about 90% complete.

2. The method of claim 1 wherein the comonomer is norbornadiene which is present in an amount between about 0.1 and 10 mole percent of the total monomer weight.

3. The method of claim 1 wherein the catalyst is a dibutyl ether complex of boron trifluoride which is present in a concentration of about 0.1–3.0 millimole per mole of trioxane.

4. The method of claim 1 wherein the reaction is carried out in the presence of a solvent for the monomers which is a liquid aliphatic or cycloaliphatic hydrocarbon of 6–7 carbon atoms, the weight of said solvent being at most about 30% of the total weight of the reaction mixture.

5. The method of claim 4 wherein the solvent is cyclohexane.

6. A method for the preparation of a thermally stable polyoxymethylene copolymer under controlled temperature conditions which comprises: (1) reacting, in an inert atmosphere and under substantially anhydrous conditions in a reaction vessel fitted with a high-speed stirrer, at a temperature of about 60–65° C. a mixture of about 90–99.9 mole percent of trioxane and about 0.1–10 mole percent of norbornadiene, in the presence of about 0.1–3.0 millimoles per mole of trioxane of boron trifluoride dibutyl etherate, until copolymerization is about 20% complete; (2) transferring the reaction mixture to a reactor adapted to impart high shear thereto and continuing said reaction likewise at a temperature of 60–65° C. under high-shear conditions until copolymerization is at least about 90–95% complete; and (3) recovering said polymer in the form of a finely divided, free-flowing powder from the reactor and removing occluded solvent therefrom by washing with acetone and water; and drying said polymer.

References Cited

UNITED STATES PATENTS

| | | | |
|---|---|---|---|
| 2,989,510 | 6/1961 | Bruni | 260—67 |
| 3,210,322 | 10/1965 | Polly et al. | 260—45.95 |
| 3,254,053 | 5/1966 | Fisher et al. | 260—67 |
| 3,294,750 | 12/1966 | Baccaredda et al. | 260—67 |
| 3,156,671 | 11/1964 | Suter et al. | 260—67 |
| 3,275,602 | 9/1966 | Weiss et al | 260—67 |
| 3,344,120 | 9/1967 | Rosen | 260—73 |

WILLIAM H. SHORT, Primary Examiner.

L. M. PHYNES, Assistant Examiner.